United States Patent
Kunimoto et al.

(10) Patent No.: US 7,385,009 B2
(45) Date of Patent: Jun. 10, 2008

(54) PROCESS FOR THE PREPARATION OF HYDROXY-VINYL-AROMATIC POLYMERS OR COPOLYMERS BY ANIONIC OR CONTROLLED RADICAL POLYMERIZATION

(75) Inventors: Kazuhiko Kunimoto, Kawahishi (JP); Peter Nesvadba, Marly (CH); Andreas Kramer, Meyriez (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 449 days.

(21) Appl. No.: 10/533,574

(22) PCT Filed: Nov. 5, 2003

(86) PCT No.: PCT/EP03/50793

§ 371 (c)(1),
(2), (4) Date: May 3, 2005

(87) PCT Pub. No.: WO2004/044017

PCT Pub. Date: May 27, 2004

(65) Prior Publication Data

US 2006/0041080 A1    Feb. 23, 2006

(30) Foreign Application Priority Data

Nov. 14, 2002 (EP) .................... 02405980

(51) Int. Cl.
*C08F 12/22* (2006.01)
*C08F 12/24* (2006.01)
*C08C 19/30* (2006.01)
*C08C 19/32* (2006.01)

(52) U.S. Cl. ................. 525/333.3; 525/342; 525/359.1; 526/346; 526/347.1

(58) Field of Classification Search ............. 525/333.3, 525/342, 359.1; 526/346, 347.1
See application file for complete search history.

(56) References Cited

U.S. PATENT DOCUMENTS 6,107,425 A * 8/2000 Sinta et al. ................. 526/313
2004/0242813 A1 12/2004 Nesvadba et al. .......... 526/135

FOREIGN PATENT DOCUMENTS

EP        0488748        6/1992

* cited by examiner

*Primary Examiner*—Roberto Rábago
(74) *Attorney, Agent, or Firm*—Joseph C. Suhadolnik

(57) ABSTRACT

The instant invention relates to a process for the preparation of hydroxy-vinyl-aromatic polymers in particular 4-hydroxystyrene polymers or copolymers by anionic or controlled radical polymerization of the respective monomer, wherein the hydroxy functionality is blocked with a protective group which is subsequently removed by reacting it with a halosilane reagent. The resulting (co)polymers have a narrow polydispersity and are useful for manufacturing photoresists.

17 Claims, No Drawings

PROCESS FOR THE PREPARATION OF HYDROXY-VINYL-AROMATIC POLYMERS OR COPOLYMERS BY ANIONIC OR CONTROLLED RADICAL POLYMERIZATION

The instant invention relates to a process for the preparation of hydroxy-vinyl-aromatic polymers in particular 4-hydroxystyrene polymers or copolymers by anionic polymerization or controlled radical polymerization of the respective monomer, wherein the hydroxy functionality is blocked with a protective group, which is subsequently removed by reacting it with a halosilane reagent. The resulting (co)polymers have a narrow polydispersity and are useful for manufacturing photoresists.

Hydroxy-vinyl aromatic polymers are very useful binder components for negative and positive acting photoresists. Important properties of the photoresist formulation, such as resolution and time for developing, depend strongly on the molecular weight of the hydroxy-vinyl aromatic polymers and of its molecular distribution.

A narrow molecular weight distribution is of high importance since it influences the glass transition temperature of the polymer. When the polymer is used in a resist formulation a glass transition temperature of above 130° C. is desirable.

Many attempts have therefore been made to prepare poly-(4-hydroxy-styrene) with a well defined molecular weight and narrow molecular weight distribution. One approach has been, to use anionic polymerization for the preparation of poly-(4-hydroxy-styrene). This polymerization process is not easy to handle, since traces of impurities, such as oxygen or water, have a negative impact on the polymer's properties.

Recently a method for the preparation of poly-(4-hydroxy-styrene) by controlled radical polymerization has been disclosed in U.S. Pat. No. 6,107,425. The method described therein uses nitroxyl radicals or alkoxyamines as regulating/initiating compounds. In particular 2,2,6,6-tetramethyl-piperidine-1-oxyl is used as regulating agent.

Controlled polymerization using alkoxyamines or stable free nitroxyl radicals together with a source of free radicals (radical initiator) is known. U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. This type of polymerization is frequently called "living polymerization". The process employs an initiator having the formula (in part) R'R"N—O—X, where X is a free radical species capable of polymerizing unsaturated monomers. The reactions typically have low conversion rates. Specifically mentioned radical R'R"N—O. groups are derived from 1,1,3,3 tetraethylisoindoline, 1,1,3,3 tetrapropylisoindoline, 2,2,6,6 tetramethylpiperidine, 2,2,5,5 tetramethylpyrrolidine or di-t-butylamine.

U.S. Pat. No. 5,322,912 to Georges et al. issued Jun. 21, 1994 discloses a polymerization process using a free radical initiator, a polymerizable monomer compound and a stable free radical agent of the basic structure R'R"N—O. for the synthesis of homopolymers and block copolymers.

Since 4-hydroxy-styrene itself is thermally not very stable it can undergo spontaneous polymerization, or the free OH-group can interact with the regulating or initiating radicals in the controlled radical polymerization process. U.S. Pat. No. 6,107,425 suggests therefore to firstly react the OH-group with a protective group, then to polymerize under controlled conditions and finally to remove the protective group by an acidic or basic treatment to obtain again the free OH-group.

All protective groups suggested in U.S. Pat. No. 6,107,425 are groups, which can be removed by acid or base treatment. Examples are acetyl, trialkylsilyl or sulfonyl groups.

The present invention differs from this prior art process in that a protective group is used, which can be removed by reaction with a halosilane reagent, such as for example iodotrimethylsilane, which can be prepared in situ, for example, from commercially easily available chlorotrimethylsilane and sodium iodide as described in J. Org. Chem., 44(8), 1247, 1979.

It has been surprisingly found that the reaction with a halosilane results in very pure hydroxy-vinyl aromatic polymers or copolymers, due to the mild reaction conditions applied. The resulting polymer is free of any discoloration and in particular shows high optical transmittance around 248 nm, which is important when the polymer is used in a resist formulation.

Furthermore nitroxyl end groups coming from the controlled radical polymerization are also removed under these conditions and the remaining polymer is therefore thermally stable. This is also an important aspect for its use in resist formulations as for example described in JP2000-26535, Sumitomo Chemical Co., Ltd.

One aspect of the instant invention is a process for the preparation of a narrow molecular weight distributed hydroxy-vinyl aromatic oligomer, cooligomer, polymer or copolymer with a polydispersity $M_w/M_n$ between 1 and 2, which process comprises the steps reacting a composition of at least one monomer of formula I

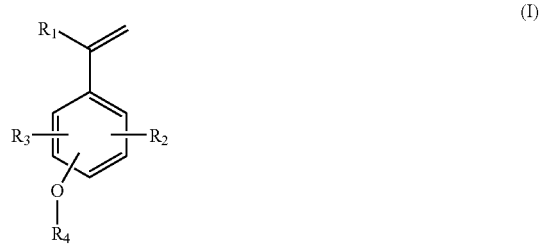

wherein $R_1$ is H or $CH_3$;

$R_2$ and $R_3$ are independently hydrogen, $C_1$-$C_8$alkyl, $C_1$-$C_8$alkoxy, $C_1$-$C_8$alkoxycarbonyl, $C_1$-$C_8$alkylthio, $C_1$-$C_8$dialkylamino, trihalogenmethyl;

$R_4$ is $C_1$-$C_{12}$alkyl or benzyl which is unsubstituted or substituted with one or two $C_1$-$C_8$alkyl, $C_1$-$C_8$alkoxy, $C_1$-$C_8$alkoxycarbonyl, $C_1$-$C_8$alkylthio, $C_1$-$C_8$dialkylamino, trihalogenmethyl, halogen; or $R_4$ is a group phenyl(methyl)CH—, (phenyl)$_2$CH—, $C_1$-$C_{12}$alkyl-O—C(O)—, phenyl-$CH_2$—O—C(O)— or (phenyl)$_2$CH—O—C(O)—;

a1) in the presence of at least one nitroxylether having the structural element

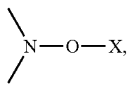

wherein X represents a group having at least one carbon atom and is such that the free radical X. derived from X is capable of initiating polymerization of ethylenically unsaturated monomers; or a2) in the presence of at least one stable free nitroxyl radical

and a free radical initiator; or a3) in the presence of a compound of formula (III)

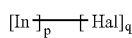

(III) and a catalytically effective amount of an oxidizable transition metal complex catalyst, wherein p represents a number greater than zero and defines the number of initiator fragments;

q represents a number greater than zero;

[In] represents a radically transferable atom or group capable of initiating polymerization and -[Hal] represents a leaving group; or a4) in an anionic polymerization reaction in the presence of a metal or organo metal catalyst;

and optionally simultaneously or in a subsequent step with one or more ethylenically unsaturated monomers different from those of formula (I); and b) isolating the resulting polymer and subjecting it to a reaction with a halosilane giving a polymer with repeating units of formula II

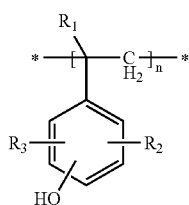

and with a degree of OH-groups of between 10 mol % and 100 mol %, based on the molar amount of protected hydroxy-vinyl aromatic monomer of formula I.

Halosilane is chloro-, bromo- or iodosilane. In a specific embodiment of the invention halosilane is iodosilane.

In a preferred embodiment of the invention polymerization is carried out according to steps a1) or a2).

The radical polymerization reaction of steps a1), a2) and a3) is preferably carried out at a temperature between 50° C. and 180° C.;

The anionic polymerization reaction may for example be carried out at a temperature between −100° C. and 150° C.

Preferred is a process wherein in formula I $R_1$ is H; $R_2$ and $R_3$ are H; $OR_4$ is in the 4-position and $R_4$ is $C_1$-$C_4$alkyl, benzyl, $C_1$-$C_4$alkoxycarbonyl or benzyloxycarbonyl.

Most preferably $R_4$ is tert.-butyl or benzyl.

The starting monomer, 4-tert-butoxystyrene, is commercially available from Hokko Chemical Inustry Co., Ltd. Another starting monomer, 4-benzyloxystyrene, can be prepared for example from 4-acetoxystyrene according to EP 589 621 or from 4-benzyloxyacetophenone according to Tetrahedron 235, (1975). Other substituted styrene derivatives of formula (I) can be prepared in analogy.

The nitroxylethers and nitroxyl radicals are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298 and GB 2335190 or the heterocyclic compounds described in GB 2342649 and WO 96/24620. Further suitable nitroxylethers and nitroxyl radicals are described in WO 02/4805 and in WO 02/100831.

Preferably the nitroxylether of step a1) is of formula A, B or O,

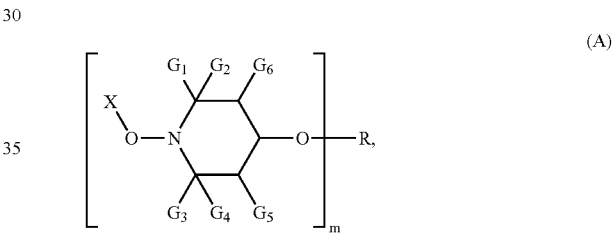

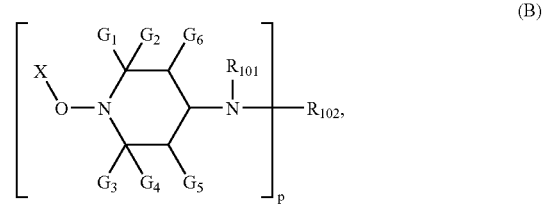

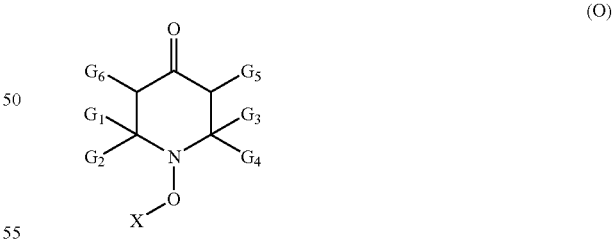

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, $(C_5$-$C_6cycloalkyl)_2CCN$, $(CH_3)_2CCN$,

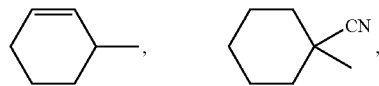

—$CH_2CH$=$CH_2$, $CH_3CH$—$CH$=$CH_2$ ($C_1$-$C_4$alkyl)$CR_{20}$—$C(O)$-phenyl, $(C_1$-$C_4)$alkyl-$CR_{20}$—$C(O)$—$(C_1$-$C_4)$alkoxy, $(C_1$-$C_4)$alkyl-$CR_{20}$—$C(O)$—$NH(C_1$-$C_4)$alkyl, $(C_1$-$C_4)$alkyl-$CR_{20}$—$C(O)$—N-di$(C_1$-$C_4)$alkyl, $(C_1$-$C_4)$alkyl-$CR_{20}$—$C(O)$—$NH(C_1$-$C_4)$alkyl, $(C_1$-$C_4)$alkyl-$CR_{20}$—$C(O)$—$NH_2$, wherein $R_{20}$ is hydrogen or $(C_1$-$C_4)$alkyl.

More preferably in formula A, B and O

R is hydrogen, $C_1$-$C_{18}$alkyl, cyanoethyl, benzoyl, glycidyl, a monovalent radical of an aliphatic, carboxylic acid;

$R_{101}$ is $C_1$-$C_{12}$alkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, glycidyl, a group of the formula —$CH_2CH(OH)$-Z or of the formula —CO-Z, wherein Z is hydrogen, methyl or phenyl; and X is $CH_3$—CH-phenyl.

The above compounds and their preparation are described in GB 2335190 and GB 2 361 235.

Another preferred group of nitroxylethers of step a1) are those of formula (Ic), (Id), (Ie), (If), (Ig) or (Ih)

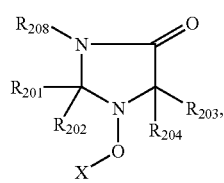
(Ic)

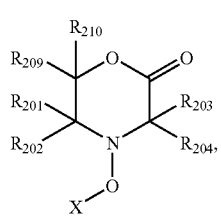
(Id)

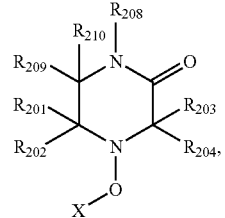
(Ie)

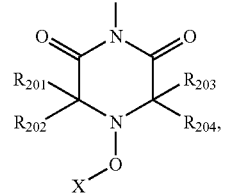
(If)

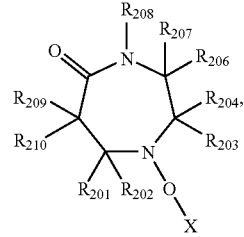
(Ig)

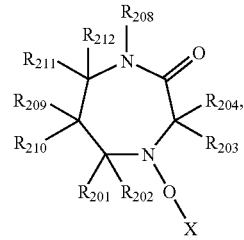
(Ih)

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —$COOC_1$-$C_{18}$alkyl;

$R_{209}$, $R_{210}$, $R_{211}$ and $R_{212}$ are independently hydrogen, phenyl or $C_1$-$C_{18}$alkyl; and X is selected from the group consisting of —$CH_2$-phenyl, $CH_3CH$-phenyl, $(CH_3)_2C$-phenyl, $(C_5$-$C_6cycloalkyl)_2CCN$, $(CH_3)_2CCN$,

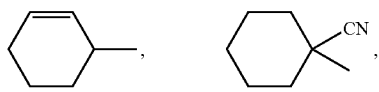

—CH$_2$CH=CH$_2$, CH$_3$CH—CH=CH$_2$ (C$_1$-C$_4$alkyl)CR$_{20}$—C(O)-phenyl, (C$_1$-C$_4$)alkyl-CR$_{20}$—C(O)—(C$_1$-C$_4$)alkoxy, (C$_1$-C$_4$)alkyl-CR$_{20}$—C(O)—(C$_1$-C$_4$)alkyl, (C$_1$-C$_4$)alkyl-CR$_{20}$—C(O)—N-di(C$_1$-C$_4$)alkyl, (C$_1$-C$_4$)alkyl-CR$_{20}$—C(O)—NH(C$_1$-C$_4$)alkyl, (C$_1$-C$_4$)alkyl-CR$_{20}$—C(O)—NH$_2$, wherein R$_{20}$ is hydrogen or (C$_1$-C$_4$)alkyl.

More preferably in formula (Ic), (Id), (Ie), (f), (Ig) and (Ih) at least two of R$_{201}$, R$_{202}$, R$_{203}$ and R$_{204}$ are ethyl, propyl or butyl and the remaining are methyl; or R$_{201}$ and R$_{202}$ or R$_{203}$ and R$_{204}$ together with the linking carbon atom form a C$_5$-C$_6$cycloalkyl radical and one of the remaining substituents is ethyl, propyl or butyl.

Most preferably X is CH$_3$CH-phenyl.

The above compounds and their preparation is described in GB 2342649.

When a nitroxyl radical is used together with a free radical initiator, the nitroxyl radical of step a2) is preferably of formula A', B' or O',

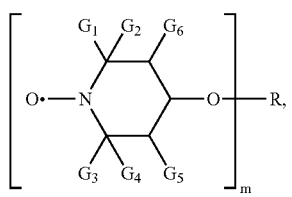

(A')

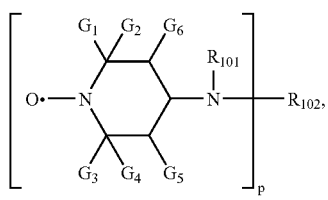

(B')

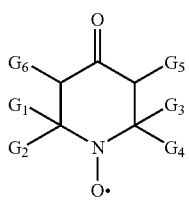

(O')

wherein
m is 1,
R is hydrogen, C$_1$-C$_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
p is 1;
R$_{101}$ is C$_1$-C$_{12}$alkyl, C$_5$-C$_7$cycloalkyl, C$_7$-C$_8$aralkyl, C$_2$-C$_{18}$alkanoyl, C$_3$-C$_5$alkenoyl or benzoyl;

R$_{102}$ is C$_1$-C$_{18}$alkyl, C$_5$-C$_7$cycloalkyl, C$_2$-C$_8$alkenyl unsubstituted or substituted by a cyano, carbonyl or carbamide group, or is glycidyl, a group of the formula —CH$_2$CH(OH)-Z or of the formula —CO-Z or —CONH-Z wherein Z is hydrogen, methyl or phenyl;

G$_6$ is hydrogen and G$_5$ is hydrogen or C$_1$-C$_4$alkyl, and
G$_1$ and G$_3$ are methyl and G$_2$ and G$_4$ are ethyl or propyl or
G$_1$ and G$_2$ are methyl and G$_3$ and G$_4$ are ethyl or propyl.

More preferably in formula A', B' and O'
R is hydrogen, C$_1$-C$_{18}$alkyl, cyanoethyl, benzoyl, glycidyl, a monovalent radical of an aliphatic, carboxylic acid;

R$_{101}$ is C$_1$-C$_{12}$alkyl, C$_7$-C$_8$aralkyl, C$_2$-C$_{18}$alkanoyl, C$_3$-C$_5$alkenoyl or benzoyl;

R$_{102}$ is C$_1$-C$_{18}$alkyl, glycidyl, a group of the formula —CH$_2$CH(OH)-Z or of the formula —CO-Z, wherein Z is hydrogen, methyl or phenyl.

The above compounds and their preparation are described in GB 2335190 and GB 2 361 235.

Another preferred group of nitroxyl radicals are those of formula (Ic'), (Id'), (Ie'), (If'), (Ig') or (Ih')

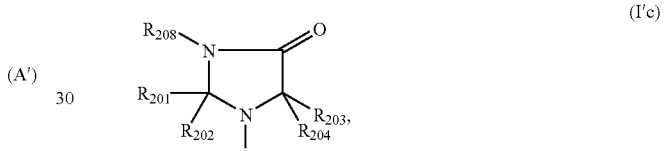

(I'c)

(I'd)

(I'e)

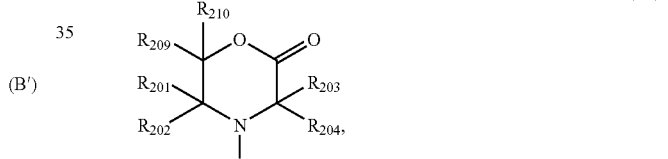

(I'f)

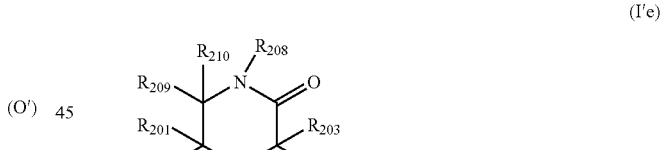

(I'g)

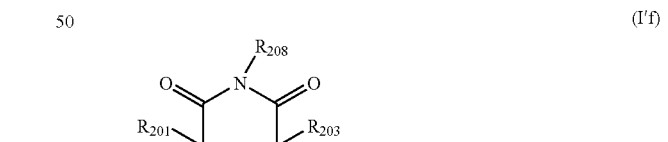

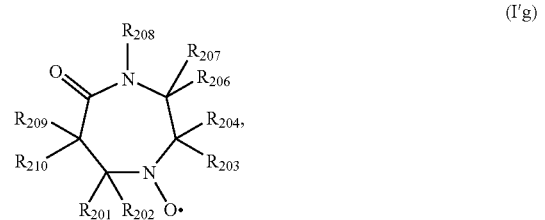

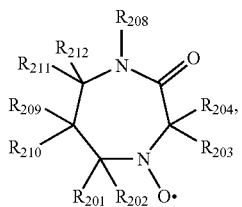

(I'h)

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl; and $R_{209}$, $R_{210}$, $R_{211}$, and $R_{212}$ are independently hydrogen, phenyl or $C_1$-$C_{18}$alkyl.

More preferably in formula (Ic'), (Id'), (Ie'), (If'), (Ig') and (Ih') at least two of $R_{201}$, $R_{202}$, $R_{203}$ and $R_{204}$ are ethyl, propyl or butyl and the remaining are methyl; or $R_{201}$ and $R_{202}$ or $R_{203}$ and $R_{204}$ together with the linking carbon atom form a $C_5$-$C_6$cycloalkyl radical and one of the remaining substituents is ethyl, propyl or butyl.

The above compounds and their preparation is described in GB 2342649.

Other suitable compounds are the 4-imino piperidine derivatives of formula V

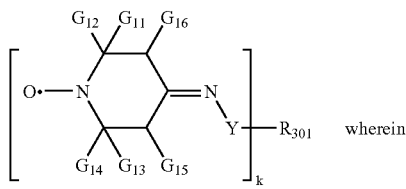

(V)

$G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;

$G_{15}$ and $G_{16}$ are each independently of the other hydrogen or $C_1$-$C_4$alkyl;

k is 1, 2, 3, or 4

Y is O, $NR_{302}$ or when n is 1 and $R_{301}$ represents alkyl or aryl Y is additionally a direct bond;

$R_{302}$ is H, $C_1$-$C_{18}$alkyl or phenyl;

if k is 1

$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR_2)_2$, —$SO_2$—$R_2$, —CO—NH—$R_2$, —$CONH_2$, $COOR_2$, or $Si(Me)_3$, wherein $Q^+$ is $H^+$, ammnonium or an alkali metal cation;

if k is 2

$R_{301}$ is $C_1$-$C_{18}$alkylene, $C_3$-$C_{18}$alkenylene or $C_3$-$C_{18}$alkinylene, which may be unsubstituted or substituted, by one or more OH, $C_1$-$C_8$alkoxy, carboxy, $C_1$-$C_8$alkoxycarbonyl; or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms;

if k is 3, $R_{301}$ is a trivalent radical of an aliphatic, cycloaliphatic or aromatic tricarboxylic acid; and if k is 4, $R_{301}$ is a tetravalent radical of an aliphatic, cycloaliphatic or aromatic tetracarboxylic acid.

Preferably $G_{16}$ is hydrogen and $G_{15}$ is hydrogen or $C_1$-$C_4$alkyl, in particular methyl, and $G_{11}$ and $G_{13}$ are methyl and $G_{12}$ and $G_{14}$ are ethyl or propyl or $G_{11}$ and $G_{12}$ are methyl and $G_{13}$ and $G_{14}$ are ethyl or propyl.

The 4 imino compounds of formula V can be prepared for example according to E. G. Rozantsev, A. V. Chudinov, V. D. Sholle.:Izv. Akad. Nauk. SSSR, Ser. Khim. (9), 2114 (1980), starting from the corresponding 4-oxonitroxide in a condensation reaction with hydroxylamine and subsequent reaction of the OH group.

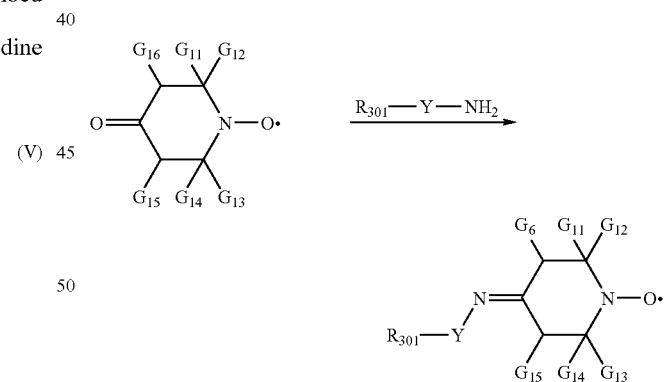

Another possible reaction scheme is to first react the 4-oxonitroxide with an amine or hydrazine to yield the corresponding imine as for example described in FR 1503149.

It is, however also possible to firstly react the 4-oxopiperidine with hydroxylamine, hydrazine or with a semicarbacide to the corresponding imino-compound and oxidising the imino piperidine to the corresponding nitroxide.

The alkoxyamines of formula I may be prepared from the corresponding nitroxides as for example described in GB 2335190.

A particularly suitable process for the preparation of the compounds of formula (V) starts from the 4-oxo-alkoxyamines, the preparation of which is also described in GB 2335190:

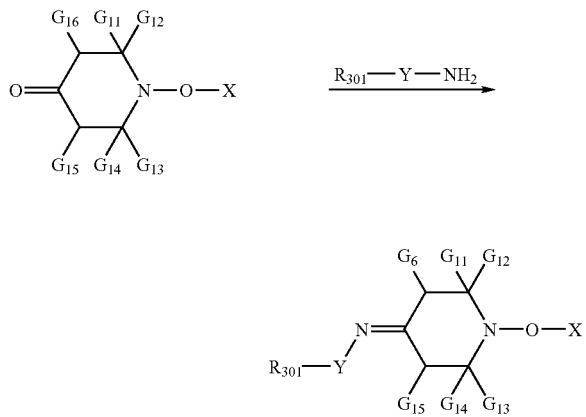

Since the 4-oxo-alkoxyamines already may have several asymmetrical carbon atoms, a variety of stereo isomers is usually obtained as mixture with different ratios of the individual isomers. It is however possible to separate the individual isomers in pure form. Mixtures of the stereo isomers as well as the pure individual isomers are within the scope of the present invention.

The imino-compounds and their preparation are described in WO 02/100831.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl.

Preferred is alkenyl with 3 bis 12, particularly preferred with 3 to 6 carbon atoms.

Alkinyl with 3 to 18 is a linear or branched radical as for example propinyl

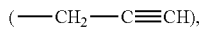

2-butinyl, 3-butinyl, n-2-octinyl, oder n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$-$C_{18}$alkyl interrupted by at least one O atom is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—$CH_2$—O—$CH_2$—$CH_3$—. It is preferably derived from polyethlene glycol. A general description is —$((CH_2)_a$—O$)_b$—H/$CH_3$, wherein a is a number from 1 to 6 and b is a number from 2 to 10.

$C_2$-$C_{18}$alkyl interrupted by at least one $NR_5$ group may be generally described as —$((CH_2)_a$—$NR_5)_b$—H/$CH_3$, wherein a, b and $R_5$ are as defined above.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$phenylalkyl is benzyl, phenylethyl or phenylpropyl.

$C_5$-$C_{10}$heteroaryl is for example pyrrol, pyrazol, imidazol, 2,4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

In general the polymerization processes using nitroxylethers a1) or nitroxyl radicals together with a free radical initiator a2) are preferred. In particular polymerization process a1) is very suitable.

Particularly suitable nitroxylethers and nitroxyl radicals are those of formulae

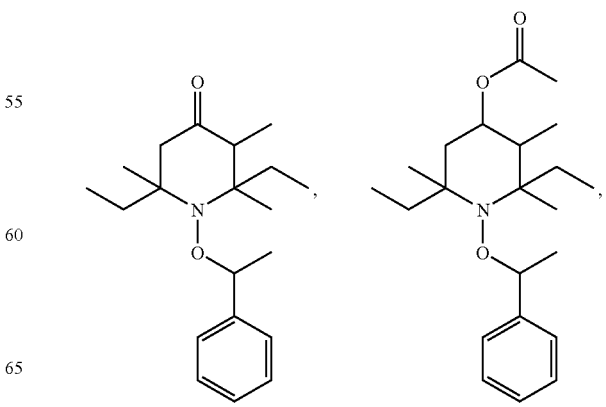

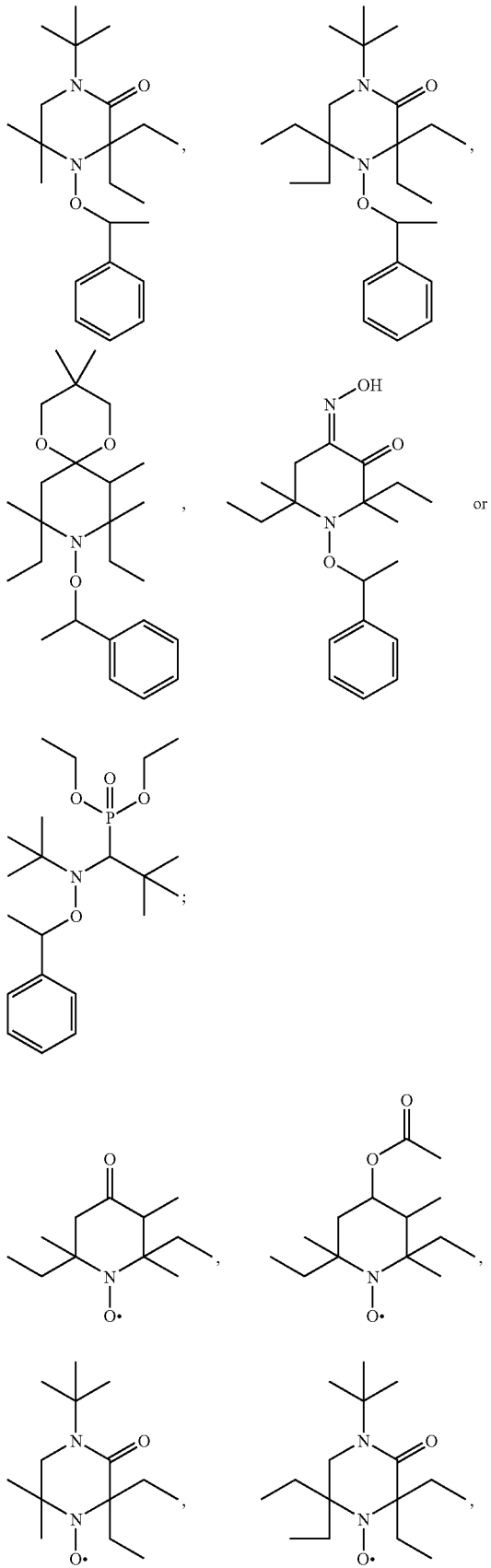

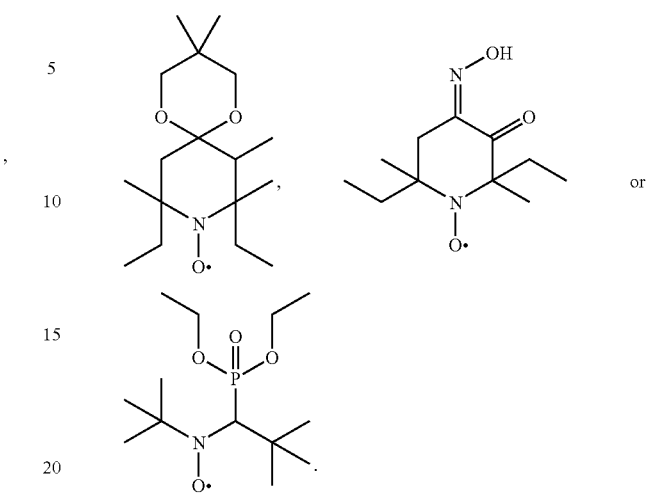

The free radical initiator of component b2) is preferably a bis-azo compound, a peroxide, perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

A suitable component a3) contains a compound of formula (III),

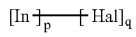

(III)

with a radically transferable atom or group •Hal as is described in WO 96/30421 and WO 98/01480.

A preferred radically transferable atom or group •Hal is •Cl or •Br, which is cleaved as a radical from the initiator molecule.

Preferably [In] represents the polymerization initiator fragment of a polymerization initiator of formula (III),

(III)

capable of initiating polymerization of monomers or oligomers which polymerization initiator is selected from the group consisting of $C_1$-$C_8$-alkyl halides, $C_6$-$C_{15}$-aralkylhalides, $C_2$-$C_8\alpha$-haloalkyl esters, arene sulfonyl chlorides, haloalkane-nitriles, α-haloacrylates and halolactones, p and q represent one and the other components are as defined above.

The polymerization process in the presence of a compound of formula (III) is known as ATRP (Atom Transfer Radical Polymerization) and WO 96/30421 discloses a controlled or "living" polymerization process of ethylenically unsaturated polymers such as styrene or (meth)acrylates by employing the ATRP method. According to this method initiators are employed which generate a radical atom such as .Cl, in the presence of a redox system of transition metals of different oxidation states, e.g. Cu(I) and Cu(II), providing "living" or controlled radical polymerization.

Specific initiators are selected from the group consisting of α,α'-dichloro- or α,α'-dibromoxylene, p-toluenesulfonyl-chloride (PTS), hexakis-(α-chloro- or α-bromomethyl)-benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloroisobutyrate, chloro- or bromoacetonitrile, 2-chloro- or 2-bromopropionitrile, α-bromo-benz-acetonitrile and α-bromo-γ-butyrolactone (=2-bromo-dihydro-2(3H)-furanone).

The transition metal in the oxidizable transition metal complex catalyst salt used in the process of the invention is present as an oxidizable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Ru^{2+}/Ru^{3+}$, $Ru^{3+}/Ru^{4+}$ $Os^{2+}/Os^{3+}$, $V^{n+}/V^{(n+1)+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$, or $Zn^+/Zn^{2+}$.

The ionic charges are counterbalanced by anionic ligands commonly known in complex chemistry of transition metals, such hydride ions (H⁻) or anions derived from inorganic or organic acids, examples being halides, e.g. F⁻, Cl⁻, Br⁻ or I⁻, fluoro complexes of the type $BF_4^-$, $PF_6^-$, $SbF_6^-$ or $AsF_6^-$, anions of oxygen acids, alcoholates or acetylides or anions of cyclopentadiene.

Anions of oxygen acids are, for example, sulfate, phosphate, perchlorate, perbromate, periodate, antimonate, arsenate, nitrate, carbonate, the anion of a $C_1$-$C_8$carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate (triflate), unsubstituted or $C_1$-$C_4$alkyl-, $C_1$-$C_4$alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methylphosphonate, ethylphosphonate, propylphosphonate, butylphosphonate, phenylphosphonate, p-methylphenylphosphonate or benzylphosphonate, carboxylates derived from a $C_1$-$C_8$carboxylic acid, for example formate, acetate, propionate, butyrate, benzoate, phenylacetate, mono-, di- or trichloro- or -fluoroacetate, and also $C_1$-$C_{12}$-alcoholates, such as straight chain or branched $C_1$-$C_{12}$-alcoholates, e.g. methanolate or ethanolate.

Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$-$C_4$ $alkyl)_4N^+$.

Suitable neutral ligands are inorganic or organic neutral ligands commonly known in complex chemistry of transition metals. They coordinate to the metal ion through a σ-, π-, μ-, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i-C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_6TREN$), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N",N"-pentamethyldiethyltriamine (PMD-ETA), $C_1$-$C_8$-glycols or glycerides, e.g. ethylene or propylene glycol or derivatives thereof, e.g. di-, tri- or tetraglyme, and monodentate or bidentate heterocyclic e⁻ donor ligands.

Heterocyclic e⁻ donor ligands are derived, for example, from unsubstituted or substituted heteroarenes from the group consisting of furan, thiophene, pyrrole, pyridine, bis-pyridine, picolylimine, g-pyran, g-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene, purine, bis-imidazole and bis-oxazole.

The oxidizable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

Preferred is a composition, wherein in the step a3) the oxidizable transition metal in the transition metal complex salt is present as a transition metal complex ion in the lower oxidation state of a redox system.

More preferred is a composition, wherein the transition metal complex ion is a Cu(I) complex ion in the Cu(I)/Cu(II) system.

Typically a catalytically effective amount of the transition metal ion defines an amount of 0.001 to 20 mol %, particularly 0.001 to 2,0 mol %, and especially 0.01 to 1.0 mol %, based on the amount of monomer.

The initiator component is preferably present in an amount of 0.01 mol % to 30 mol %, more preferably in an amount of 0.1 mol % to 10 mol % and most preferably in an amount of 0.1 to 5 mol %, based on the monomer, oligomer or monomer/oligomer mixture used.

It is also possible to carry out the first step as an anionic polymerization (reaction a4). Anionic polymerizations are known and for example described in Encyclopedia of Polymer Science and Technology, vol. 2, 1964, 95-137.

The anionic polymerization is for example carried out in an appropriate organic solvent in the presence of an organic alkali metal compound and/or an alkali metal as a polymerzation initiator at a temperature of −100° C. to 150° C. in the atomosphere of an inert gas such as nitrogen or argon.

Examples of polymerization initiators include alkali metals such as lithium, sodium and potassium; and/or organic alkali metal compounds such as ethyl lithium, n-butyl lithium, sec-butyl lithium, tert-butyl lithium, butadienyl dilithium, butadienyl disodium, lithium biphenylide, sodium biphenylide, lithium di-tert-butylbiphenylide, sodium di-tert-butylbiphenylide, lithium naphthalenide, sodium naphthalenide, lithium triphenylide, sodium triphenylide, α-methylstyrenesodium anion radical, 1,1-diphenyl hexyl lithium, and 1,1-diphenyl-3-methylpentyl lithium.

The polymerization is typically carried out in a solvent. Solvents are, for example, aliphatic hydrocarbons such as n-hexane and n-heptane; alicyclic hydrocarbons such as cyclohexane and cyclopentane; aromatic hydrocarbons such as benzene and toluene; aliphatic ethers such as diethyl ether; cyclic ethers such as tetrahedrofuran and dioxane; and the like.

The polymerization process according to step a1) is in general preferred.

A very suitable process is, wherein the nitroxyl ether of formula

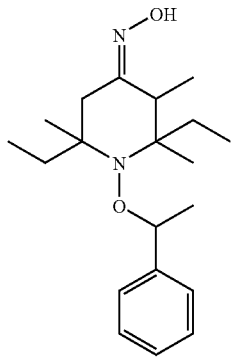

is used in the polymerization step a1).

Preferably the optionally used additional ethylenically unsaturated monomer is selected from the group consisting of an acrylic acid ester, acrylamide, acryinitrile, methacrylic acid ester, methacrylamide, methacryinitrile and styrene.

Acrylic acid esters and methacrylic acid esters are typically $C_1$-$C_{18}$ alkyl esters.

Such an additional monomer is preferably used in an amount of 1 part to 30 parts based on 100 parts of hydroxy functional vinyl aromatic monomer.

Most preferred is n-butylacrylate, tert-butylacrylate, methylacrylate, ethylacrylate, propylacrylate, hexylacrylate, hydroxyethylacrylate and styrene.

Preferably the nitroxylether of step a1) or the nitroxyl radical of step a2) is present in an amount of from 0.001 mol-% to 20 mol-%, more preferably of from 0.002 mol-% to 10 mol-% and most preferably of from 0.005 mol-% to 5 mol-% based on the monomer or monomer mixture.

Preferably the free radical initiator is present in an amount of 0.001 mol-% to 20 mol-%, based on the monomer or monomer mixture.

The molar ratio of free radical initiator to stable free nitroxyl radical is preferably from 20:1 to 1:2, more preferably from 10:1 to 1:2.

Scission of the O—X bond of the nitroxylether may be effected by ultrasonic treatment, radiation with actinic light or heating.

The scission of the O—X bond is preferably effected by heating and takes place at a temperature of between 50° C. and 180° C., more preferably from 90° C. to 150° C.

Consequently the polymerization temperature in the steps a1), a2) or a3) is between 90° C. and 150° C.

The polymerization reaction is carried out with preference under atmospheric pressure.

Preferably the hydroxy-vinyl aromatic oligomer, cooligomer, polymer or copolymer has a weight molecular weight average from 2000 to 30 000 Daltons.

Preferably the hydroxy-vinyl aromatic oligomer, cooligomer, polymer or copolymer has a polydispersity $M_w/M_n$ of between 1.1 and 1.8, in particular between 1.1 and 1.6.

After the polymerization step is completed the reaction mixture may be cooled down to a temperature below 60° C., preferably to room temperature. The polymer may be stored at this temperature without further reactions occurring.

The radical polymerization process may be carried out in bulk, in the presence of an organic solvent or in the presence of water or in mixtures of organic solvents and water. Additional cosolvents or surfactants, such as glycols or ammonium salts of fatty acids, may be present. Other suitable cosolvents are described hereinafter.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), anisol, or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

At the end of polymerization step, the reaction mixture may be optionally treated with a hydrogen donor like phenol, hydroquinone, catechol, thiol and hydroxylamine at a temperature between 50° C. and 180° C. or with a peracid to remove the terminal nitroxyl group as described in Macromol. Chem. Phys. 199, 583 (1998) or JP2000-026535.

The protective group $R_4$ is removed in a reaction with an halosilane reagent, step b). This type of reaction is in principal known.

In a specific embodiment of the invention the halosilane reagent of step b) is $R_{13}R_{14}R_{15}SiX$, wherein $R_{13}$, $R_{14}$ and $R_{15}$ are independently $C_1$-$C_8$alkyl, chloromethyl, vinyl or phenyl and X is Cl, Br or I.

In one preferred embodiment X is I.

The reaction is usually carried out under atmospheric pressure at a temperature from 10° C. to 150° C., preferably from 30° C. to 100° C.

In a specific embodiment of the invention the process of step b), the reaction with an halosilane reagent, is carried out using a chlorosilane reagent from $R_{13}R_{14}R_{15}SiCl$ wherein $R_{13}$, $R_{14}$ and $R_{15}$ are independently $C_1$-$C_8$alkyl, chloromethyl, vinyl or phenyl in the presence of halide salt and/or thiol, wherein the halide salt is selected from the group consisting of alkaline metal halide, alkaline-earth metal halide, ammonium halide or phosphonium halide.

For example the halide salt is a bromide or iodide salt.

For instance the molar ratio of halide salt to chlorosilane is from 1:50 to 2:1.

In one embodiment of the invention the reaction with an iodosilane reagent is carried out by in situ generation of iodotrimethylsilane using chlorotrimethylsilane and sodium iodide as described in J. Org. Chem., 44(8), 1247, 1979.

In another specific embodiment of the invention the monomer is 4-tert.-butoxystyrene or 4-benzyloxystyrene, the polymerization step is carried out according to step a1 using 2,6-diethyl-2,3,6-trimethyl-1-(1-phenyl-ethoxy)-piperidine-4-one oxime, optionally followed by treating the polymer with thioglycolic acid, 2-ethylhexylthioglycolate or thiosalicylic acid at a temperature between 130 and 145° C. In the deprotection step b) the halosilane is chlorotrimethylsilane and the halide salt is NaI, KI or NaBr. The Thiol is thioglycolic acid or 2-ethylhexylthioglycolate. The deprotection is preferably carried out in a solvent, such as 2-butanone, acetonitrile or ethyacetate at a temperature from 20° C. to 80° C.

The hydroxy-vinyl-aromatic polymer with low polydispersity prepared according to the present invention is particularly useful as binder material for negative or positive working photoresists. It's main use however is in positive photo resists. The formulation of such resists is known to those skilled in the art and for example described in EP 813 113 or EP 488 748.

Consequently a further aspect of the invention is a formulated photoresist prepared from a polymer obtainable by a process as described above.

The following examples illustrate the invention.

Preparation of 2,6-Diethyl-2,3,6-trimethyl-1-(1-phenyl-ethoxy)-piperidine-4-one oxime (Compound 1 According to WO 02/100831)

2,6-diethyl-2,3,6-trimethyl-1-(1-phenyl-ethoxy)-4-oxopiperidine prepared according to DE 199 09 767 A1 is dissolved in methanol containing 10% by weight of KOH and stirred for 5 hours at room temperature. Methanol is evaporated, the residue is washed with water and dried in vacuo. A solution of 95.24 g (0.3 mol) of 2,6-diethyl-2,3,6-trimethyl-1-(1-phenyl-ethoxy)-4-oxopiperidine and 29.7 g (0.45 mol) 50% aqueous hydroxylamine solution in 150 ml of methanol is stirred under reflux during 5 h. The suspension is then cooled to −8° C. and filtered. The solid is washed with 100 ml of a cold (−20° C.) methanol and dried to afford 64 g (64.1%) of the title compound as a white, microcrystalline powder, mp 130-145 oC. $C_{20}H_{32}N_2O_2$ (332.49) calculated C 72.25%, H 9.70%, N 8.43%; found 72.19% C, 9.54% H, 8.43% N.

A) Preparation of Polymers

EXAMPLE A1

4-Benzyloxystyrene (10.5 g, 50.0 mmol) and compound 1 (0.223 g, 0.667 mmol) are placed in a 100 mL schlenk tube and degassed, followed by purging with Ar. The mixture is heated to 130° C. and stirred for 6 h under Ar. The reaction mixture is cooled down to room temperature and dissolved in $CH_2Cl_2$ (15 mL). The polymer is precipitated in MeOH (300 mL) and washed with MeOH. The precipitation is repeated twice, and 7.17 g of white solid are obtained after drying in a vacuum oven overnight. GPC analysis using tetrahydrofuran (THF) as mobile phase and calibration with polystyrene standard shows Mn=7723, Mw/Mn=11.19. $^1$H NMR ($CDCl_3$): 0.7-2.4 (br m), 4.9 (br s), 6.0-6.9 (br m), 6.9-7.6 (br m).

EXAMPLE A2

4-t-Butoxystyrene (17.6 g, 100 mmol) and the compound (1) (0.555 g, 1.67 mmol) are placed in a 100-mL schlenk tube and degassed, followed by purging with Ar. The mixture is heated to 130° C. and stirred for 8 h under Ar. The reaction mixture is cooled down to room temperature and dissolved in EtOAc (15 mL). The polymer is purified by repeated precipitation from MeOH (150 mL). 14.1 g of white solid are obtained after drying in a vacuum oven overnight. GPC analysis using THF as mobile phase and calibration with polystyrene standard shows Mn=7970, Mw/Mn=1.10. $^1$H NMR ($CDCl_3$): 0.8-2.4 (br m), 6.1-7.2 (br m).

EXAMPLE A3

4-t-Butoxystyrene (17.6 g, 100 mmol), the compound (1) (0.55 g, 1.67 mmol) and p-xylene (2.48 g) are placed in a 50-mL test tube and degassed, followed by purging with $N_2$. The mixture is heated to 130° C. and stirred for 15 h under $N_2$. 12.6 g of white solid are obtained after the same work-up as described in example A2. Mn=8070, Mw/Mn=1.13.

EXAMPLE A4

4-t-Butoxystyrene (584 g, 3.31 mol), the compound (1) (12.3 g, 37.0 mmol) and butyl acetate (64.9 g) are placed in a 1-L flask, and the inner gas is replaced with $N_2$. The mixture is heated to 125-135° C. and stirred for 24 h under $N_2$. 527 g of white solid are obtained after precipitation from MeOH. Mn=13140, Mw/Mn=1.11.

EXAMPLE A5

4-t-Butoxystyrene (17.7 g, 101 mmol), the compound (1) (0.348 g, 1.05 mmol) and butyl acetate (2.13 g) are placed in a 50-mL test tube, and the inner gas is replaced with $N_2$. The mixture is heated to 125° C. and stirred for 25 h under $N_2$. 15.4 g of white solid are obtained after the same work-up as described in example A2. Mn=14530, Mw/Mn=1.08.

EXAMPLE A6

4-t-Butoxystyrene (441 g, 2.50 mol), the compound (1) (4.75 g, 14.3 mmol) and butyl acetate (49 g) are placed in a 1-L 3-necked flask, and the inner gas is replaced with $N_2$. The mixture is heated to 125-135° C. and stirred for 24 h under $N_2$. 493 g of white solid are obtained after repeated precipitation from MeOH. Mn=21920, Mw/Mn=1.14.

EXAMPLE A7

4-t-Butoxystyrene (17.7 g, 101 mmol), the compound (1) (0.475 g, 1.43 mmol) and butyl acetate (1.98 g) are placed in a 50-mL test tube, and the inner gas is replaced with $N_2$. The mixture is heated to 130° C. and stirred for 24 h under $N_2$. After cooling down to room temperature, 4,4'-thiobis(6-tert-butyl-m-cresol) (2.05 g, 5.71 mmol) is added, and the reaction mixture are heated at 130° C. for 4 h after replacing the inner gas with $N_2$. 14.3 g of white solid are obtained after the same work-up as described in example A2. Mn=9120, Mw/Mn=1.09.

EXAMPLE A8

4-t-Butoxystyrene (17.7 g, 101 mmol), the compound (1) (0.444 g, 1.34 mmol) and butyl acetate (2.00 g) are placed in a 50-mL test tube, and the inner gas is replaced with $N_2$. The mixture is heated to 130° C. and stirred for 29 h under $N_2$. After cooling down to room temperature, 4,4'-Thiobis (6-tert-butyl-m-cresol) (0.96 g, 2.68 mmol) and butyl acetate (2 mL) are added, and the reaction mixture are heated at 130° C. for 4 h after replacing the inner gas with $N_2$. 15.8 g of white solid are obtained after the same work-up as described in example A2. Mn=10070, Mw/Mn=1.10.

EXAMPLE A9

4-t-Butoxystyrene (1.06 kg, 6.00 mol), the compound (1) (25.0 g, 75.2 mmol) and butyl acetate (118 g) are placed in a 2-L 3-necked flask, and the inner gas is replaced with $N_2$. The mixture is heated to 125-135° C. and stirred for 24 h under $N_2$. After cooling down to room temperature, thioglyclic acid (55.3 g, 600 mmol) and butyl acetate (250 mL) are added, and the reaction mixture are heated at 140° C. for 16 h after replacing the inner gas with $N_2$. 888 g of white solid are obtained after repeated precipitation from MeOH. Mn=11140, Mw/Mn=1.06.

EXAMPLE A10

4-t-Butoxystyrene (17.6 g, 100 mmol), the compound (1) (0.372 g, 1.12 mmol) and butyl acetate (2.19 g) are a 50-mL test tube, and the inner gas is replaced with $N_2$. The mixture is heated to 130° C. and stirred for 24 h under $N_2$. 2.05 g of the reaction mixture and thiosalicylic acid (0.184 g, 1.19 mmol) are dissolved in 2.0 mL of butyl acetate. This mixture is heated at 130° C. for 15 h. The polymer is dissolved in ethyl acetate and washed with $K_2CO_3$ aq. solution. After condensation, the polymer is precipitated from 5% aqueous MeOH (50 mL). 1.39 g of pale yellow solid is collected. Mn=11440, Mw/Mn=1.08.

EXAMPLE A11

4-t-Butoxystyrene (17.7 g, 101 mmol), the compound (1) (0.224 g, 0.674 mmol) and butyl acetate (2.01 g) are placed in a 50-mL test tube, and the inner gas is replaced with $N_2$. The mixture is heated to 130° C. and stirred for 29 h under $N_2$. After cooling down to room temperature, 4,4'-thiobis(6-tert-butyl-m-cresol) (0.49 g, 1.37 mmol) and butyl acetate (2 mL) are added, and the reaction mixture are heated at 130° C. for 4 h after replacing the inner gas with $N_2$. 15.5 g of white solid are obtained after the same work-up as described in example A2. Mn=17950, Mw/Mn=1.13.

EXAMPLE A12

4-t-Butoxystyrene (17.6 g, 100 mmol), the compound (1) (0.172 g, 0.517 mmol) and butyl acetate (1.97 g) are placed in a 50-mL test tube, and the inner gas is replaced with $N_2$. The mixture is heated to 130° C. and stirred for 24 h under $N_2$. After cooling down to room temperature, 4,4'-thiobis(6-tert-butyl-m-cresol) (0.74 g, 2.06 mmol) is added, and the reaction mixture are heated at 130° C. for 4 h after replacing the inner gas with $N_2$. 14.4 g of white solid are obtained after the same work-up as described in example A2. Mn=23080, Mw/Mn=1.12.

EXAMPLE A13

The polymer prepared in example A6 (142.9 g) and 2-ethylhexyl thioglycolate (14.6 g, 71.3 mmol) are placed in a 500-mL flask, and the inner gas is replaced with $N_2$. The mixture is heated at 130° C. for 20 h under $N_2$. 138.9 g of white solid are obtained after the same work-up as described in example A2. Mn=23080, Mw/Mn=1.12.

EXAMPLE A14

4-t-Butoxystyrene (17.6 g, 100 mmol), styrene (1.85 g, 17.8 mmol) and the compound (1) (0.392 g, 1.18 mmol) are placed in a 50-mL test tube, and the inner gas is replaced with $N_2$. The mixture is heated to 130° C. and stirred for 8 h under $N_2$. 15.0 g of white solid are obtained after the same work-up as described in example A2. Mn=11300, Mw/Mn=1.06. $^1$H NMR (CDCl$_3$): 0.8-2.4 (br m), 6.1-7.2 (br m). The polymer is identified by $^1$H NMR as copolymer of 4-t-butoxystyrene and styrene, and the molar ratio is estimated to be 90:10.

EXAMPLE A15

The polymer prepared in example A14 (5.01 g), thioglycolic acid (0.240 g, 2.61 mmol) and butyl acetate (3.0 mL) are placed in a 30-mL flask, and the inner gas is replaced with $N_2$. The mixture is heated at 130° C. for 18.5 h under $N_2$. 4.53 g of white solid are obtained by precipitation from MeOH (100 mL) and $H_2O$ (10 mL). Mn=11240, Mw/Mn=1.07.

B) Deprotection

EXAMPLE B1

1.02 g of poly(4-benzyloxystyrene), prepared in example A1, 1.52 g of sodium iodide, 1.3 mL of chlorotrimethylsilane and 5.0 mL of acetonitrile are placed in a 30 mL round bottom flask. After heating at 80° C. for 3 hours, sodium thiosulfate aqueous solution and ethyl acetate are added. The organic layer is washed with water and then brine, followed by drying over anhydrous MgSO4. After condensation, the resulting solid is dissolved in 10 mL of MeOH and precipitated in $CH_2C_2$/hexane (1:1, 200 mL), followed by washing with this solvent mixture. 0.58 g of a white solid are obtained after drying in a vacuum oven overnight. GPC analysis using DMF including LiBr as mobile phase and calibration with polystyrene standard shows Mn=22744, Mw/Mn=1.25. $^1$H NMR shows the disappearance of the benzylic protons. Transmittance at 248 nm of the polymer is 70% in EtOH at 0.1 g/L concentration (cell length: 1 cm). $^1$H NMR (DMSO-d6): 0.6-2.0 (br m, 3 H), 5.9-6.8 (br m, 4 H), 9.0 (br s, 1 H).

EXAMPLE B2

1.00 g of poly(4-t-butoxystyrene), prepared in example A3 and 10.0 mL of acetonitrile are placed in a 30-mL 3-necked flask. To this solution are added NaI (0.79 g, 5.3 mmol) and chlorotrimethylsilane (0.54 g, 5.0 mmol) at room temperature. The mixture is stirred under reflux for 3 h. After adding 10% sodium thiosulfate aq. solution (15 mL), polymer is extracted with ethyl acetate (25 mL). The ethyl acetate layer is washed with water and brine, followed by drying over anhydrous $Na_2SO_4$. After condensation 0.72 g of white solid is obtained. Mn=7240, Mw/Mn=1.20.

EXAMPLE B3

1.00 g of poly(4-t-butoxystyrene), prepared in example A7, is dissolved in 3.0 mL of acetonitrile and 3.0 mL of ethyl acetate. To this solution are added NaI (1.04 g, 7.0 mmol) and chlorotrimethylsilane (0.79 g, 7.4 mmol) at room temperature. The mixture is stirred at room temperature for 18 h. After the same work up as described in Example B2, 0.67 g of white solid is obtained. Mn=8440, Mw/Mn=1.15.

EXAMPLE B4

1.00 g of poly(4-t-butoxystyrene), prepared in example A8, is dissolved in 10.0 mL of acetonitrile. To this solution are added NaI (1.06 g, 7.1 mmol) and chlorotrimethylsilane (0.76 g, 7.0 mmol) at room temperature. The mixture is stirred at room temperature for 18 h. After the same work up as described in Example B2, 0.74 g of white solid is obtained. Mn=9720, Mw/Mn=1.11.

EXAMPLE B5

737 g of poly(4-t-butoxystyrene), prepared in example A9, and 774 g (5.16 mol) of NaI and 5.2 L of ethyl acetate are placed in a 20-L separable flask. To this solution is added dropwise chlorotrimethylsilane (561 g, 5.16 mol) at room temperature. The mixture is stirred at room temperature for 2.5 h. 10% ascorbic acid aqueous solution is added and the organic layer is repeatedly washed with 10% ascorbic acid aqueous solution, water and brine, followed by drying over anhydrous $Na_2SO_4$. After condensation the residue is dissolved in MeOH, and precipitation from water afforded 517 g of white solid. Mn=9950, Mw/Mn=1.06. This polymer showed 75% of transmittance at 248 nm (at 0.1 g/L in EtOH, 1 cm-cell).

EXAMPLE B6

450 g of poly(4-t-butoxystyrene), prepared in example A4, and 450 g (3.00 mol) of NaI and 1.4 L of ethyl acetate are placed in a 5-L separable flask. To this solution is added dropwise chlorotrimethylsilane (333 g, 3.07 mol) at room temperature. The mixture is stirred at room temperature for 2.5 h. After the same work up as described in Example B5, 363 g of white solid is obtained. Mn=11700, Mw/Mn=1.16.

EXAMPLE B7

1.00 g of poly(4-t-butoxystyrene), prepared in example A10, is dissolved in 3.0 mL of acetonitrile and 3.0 mL of ethyl acetate. To this solution are added NaI (1.05 g, 7.0 mmol) and chlorotrimethylsilane (0.90 mL, 7.1 mmol) at room temperature. The mixture is stirred at room temperature for 15 h. After the same work up as described in Example B2, 0.71 g of white solid is obtained. Mn=9960, Mw/Mn=1.09.

EXAMPLE B8

1.00 g of poly(4-t-butoxystyrene), prepared in example A11, is dissolved in 10.0 mL of acetonitrile. To this solution are added NaI (1.06 g, 7.1 mmol) and chlorotrimethylsilane (0.82 g, 7.5 mmol) at room temperature. The mixture is stirred at room temperature for 19.5 h. After the same work up as described in Example B2, 0.73 g of white solid is obtained. Mn=15890, Mw/Mn=1.15.

EXAMPLE B9

1.00 g of poly(4-t-butoxystyrene), prepared in example A12, is dissolved in 3.0 mL of acetonitrile and 3.0 mL of ethyl acetate. To this solution are added NaI (1.05 g, 7.0 mmol) and chlorotrimethylsilane (0.79 g, 7.3 mmol) at room temperature. The mixture is stirred at room temperature for 18 h. After the same work up as described in Example B2, 0.68 g of white solid is obtained. Mn=21660, Mw/Mn=1.20.

EXAMPLE B10

1.00 g of poly(4-t-butoxystyrene), prepared in example A6, is dissolved in 6.0 mL of 2-butanone. To this solution are added NaI (0.090 g, 0.60 mmol) and chlorotrimethylsilane (0.65 g, 6.0 mmol) at room temperature. The mixture is stirred at 50° C. for 18 h, and then MeOH is added. Precipitation from $H_2O$ afforded 0.59 g of white solid. Mn=20220, Mw/Mn=1.16.

EXAMPLE B11

1.02 g of poly(4-t-butoxystyrene), prepared in example A6, is dissolved in 3.0 mL of 2-butanone. To this solution are added NaI (0.098 g, 0.65 mmol), 2-ethylhexylthioglycolate (0.15 mL, 0.72 mmol) and then chlorotrimethylsilane (0.80 mL, 6.3 mmol) at room temperature. The mixture is stirred at 80° C. for 3.5 h. After the same work up as described in Example B10, 0.62 g of white solid is obtained. Mn=19350, Mw/Mn=1.14.

EXAMPLE B12

1.00 g of poly(4-t-butoxystyrene), prepared in example A6, is dissolved in 6.0 mL of 2-butanone. To this solution are added KBr (0.73 g, 6.1 mmol), 2-ethylhexylthioglycolate (1.30 mL, 6.20 mmol) and then chlorotrimethylsilane (0.68 mL, 6.2 mmol) at room temperature. The mixture is stirred at 50° C. for 3.5 h. After the same work up as described in Example B10, 0.65 g of white solid is obtained. Mn=19300, Mw/Mn=1.13.

EXAMPLE B13

1.03 g of poly(4-t-butoxystyrene), prepared in example A6, is dissolved in 6.0 mL of 2-butanone. To this solution are added NaCl (0.36 g, 6.1 mmol) and chlorotrimethylsilane (0.80 mL, 6.3 mmol) at room temperature. The mixture is stirred at 80° C. for 20 h. After the same work up as described in Example B10, 0.61 g of white solid is obtained. Mn=19290, Mw/Mn=1.17.

EXAMPLE B14

1.03 g of poly(4-t-butoxystyrene), prepared in example A6, is dissolved in 6.0 mL of 2-butanone. To this solution are added 2-ethylhexylthioglycolate (1.30 mL, 6.20 mmol) and chlorotrimethylsilane (0.67 g, 6.2 mmol) at room temperature. The mixture is stirred at 50° C. for 6.5 h, and then MeOH is added. After precipitation from hexane, 0.34 g of white solid is obtained. Mn=19460, Mw/Mn=1.13.

EXAMPLE B15

10.0 g of poly(4-t-butoxystyrene), prepared in example A13, is dissolved in 30.0 mL of 2-butanone. To this solution are added NaI (0.90 g, 6.00 mmol) and chlorotrimethylsilane (7.60 mL, 59.9 mmol) at room temperature. The mixture is stirred at 80° C. for 3.5 h, and then MeOH is added. After precipitation from $H_2O$, 6.41 g of white solid is obtained. Mn=19070, Mw/Mn=1.13.

EXAMPLE B16

The polymer prepared in example A15 (1.08 g) is dissolved in ethyl acetate (7.0 mL). To this solution are added NaI (1.06 g, 6.98 mmol) and chlorotrimethylsilane (1.01 g, 9.29 mmol) at room temperature. The mixture is stirred for 4 h. After adding 10% ascorbic acid aq. solution, polymer is extracted with ethyl acetate. The ethyl acetate layer is washed with water and brine, followed by drying over anhydrous $Na_2SO_4$. After condensation 0.86 g of yellow solid is obtained. Mn=10360, Mw/Mn=1.07. $^1$H NMR (DMSO-$d_6$): 0.7-2.2 (br m), 5.9-6.8 (br m), 6.8-7.3 (br m), 8.7-9.1 (br s).

The invention claimed is:

1. A process for the preparation of a narrow molecular weight distributed hydroxy-vinyl aromatic oligomer, cooligomer, polymer or copolymer with a polydispersity $M_w/M_n$ between 1 and 2, which process comprises the steps reacting a composition of at least one monomer of formula I

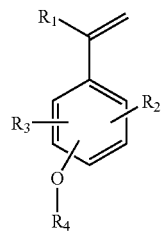

wherein
$R_1$ is H or $CH_3$;
$R_2$ and $R_3$ are independently hydrogen, $C_1$-$C_8$alkyl, $C_1$-$C_8$alkoxy, $C_1$-$C_8$alkoxycarbonyl, $C_1$-$C_8$alkylthio, $C_1$-$C_8$dialkylamino, trihalogenmethyl;
$R_4$ is $C_1$-$C_{12}$alkyl or benzyl which is unsubstituted or substituted with one or two $C_1$-$C_8$alkyl, $C_1$-$C_8$alkoxy, $C_1$-$C_8$alkoxycarbonyl, $C_1$-$C_8$alkylthio, $C_1$-$C_8$dialkylamino, trihalogenmethyl, halogen; or $R_4$ is a group phenyl(methyl)CH—, (phenyl)$_2$CH—, $C_1$-$C_{12}$alkyl-O—C(O)—, phenyl-$CH_2$—O—C(O)— or (phenyl)$_2$CH—O—C(O)—;

a1) in the presence of at least one nitroxylether having the structural element

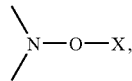

wherein
X represents a group having at least one carbon atom and is such that the free radical X. derived from X is capable of initiating polymerization of ethylenically unsaturated monomers; or a2) in the presence of at least one stable free nitroxyl radical

and a free radical initiator; or a3) in the presence of a compound of formula (III)

and a catalytically effective amount of an oxidizable transition metal complex catalyst, wherein
p represents a number greater than zero and defines the number of initiator fragments;
q represents a number greater than zero;
[In] represents a radically transferable atom or group capable of initiating polymerization and -[Hal] represents a leaving group; or a4) in an anionic polymerization reaction in the presence of a metal or organo metal catalyst; and optionally simultaneously or in a subsequent step with one or more ethylenically unsaturated monomers different from those of formula (I); and b) isolating the resulting oligomer, cooligomer, polymer or copolymer and subjecting it to a reaction with a halosilane giving a polymer with repeating units of formula II

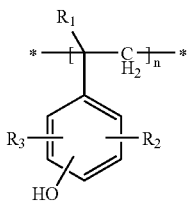
(II)

and with a degree of OH-groups of between 10 mol % and 100 mol %, based on the molar amount of protected hydroxy-vinyl aromatic monomer of formula I.

2. A process according to claim 1 wherein halosilane is iodosilane.

3. A process according to claim 1 wherein the polymerization is carried out according to steps a1) or a2).

4. A process according to claim 1 wherein in formula I
$R_1$ is H;
$R_2$ and $R_3$ are H;
$OR_4$ is in the 4-position and $R_4$ is $C_1$-$C_4$alkyl, benzyl, $C_1$-$C_4$alkoxycarbonyl or benzyloxycarbonyl.

5. A process according to claim 1, wherein the nitroxylether in step a1) is of formula A, B or O,

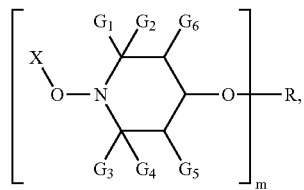
(A)

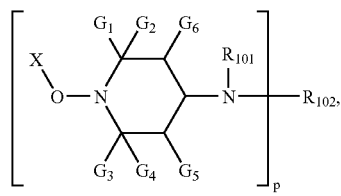
(B)

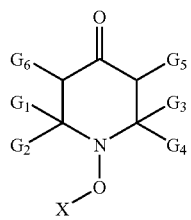
(O)

wherein
m is 1,
R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, $(C_5$-$C_6$cycloalkyl$)_2$ CCN, $(CH_3)_2$CCN,

—$CH_2CH$=$CH_2$, $CH_3CH$—CH=$CH_2$ ($C_1$-$C_4$alkyl) $CR_{20}$—C(O)-phenyl, ($C_1$-$C_4$)alkyl-$CR_{20}$—C(O)—($C_1$-$C_4$) alkoxy, ($C_1$-$C_4$)alkyl-$CR_{20}$—C(O)—($C_1$-$C_4$)alkyl, ($C_1$-$C_4$) alkyl-$CR_{20}$—C(O)—N—di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C (O)—$NH_2$, wherein $R_{20}$ is hydrogen or ($C_1$-$C_4$)alkyl.

6. A process according to claim 1, wherein the nitroxylether of step a1) is of formula (Ic), (Id), (Ie), (If), (Ig) or (Ih)

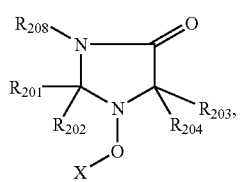
(Ic)

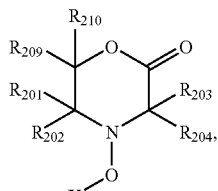
(Id)

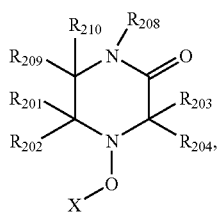
(Ie)

-continued

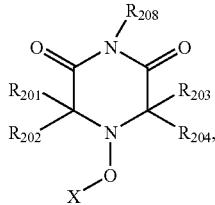
(If)

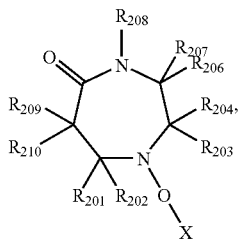
(Ig)

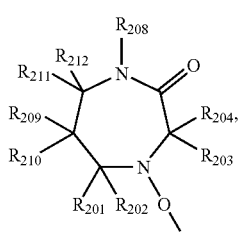
(Ih)

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group-O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$$C_{18}$alkyl;

$R_{209}$, $R_{210}$, $R_{211}$ and $R_{212}$ are independently hydrogen, phenyl or $C_1$-$C_{18}$alkyl; and X is selected from the group consisting of —$CH_2$-phenyl, $CH_3CH$-phenyl, $(CH_3)_2C$-phenyl, $(C_5$-$C_6$cycloalkyl)$_2$CCN, $(CH_3)_2$CCN,

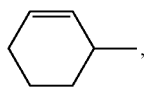 ,  ,

—$CH_2CH$=$CH_2$, $CH_3CH$—CH=$CH_2$, ($C_1$-$C_4$alkyl) $CR_{20}$—C(O)-phenyl, ($C_1$-$C_4$)alkyl-$CR_{20}$—C(O)—($C_1$-$C_4$) alkoxy, ($C_1$-$C_4$)alkyl-$CR_{20}$—C(O)—($C_1$-$C_4$)alkyl, ($C_{1-C4}$) alkyl-$CR_{20}$—C(O)—N—di($C_{1-C4}$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl.

7. A process according to claim 1, wherein the nitroxyl radical of step a2) is of formula A', B' or O',

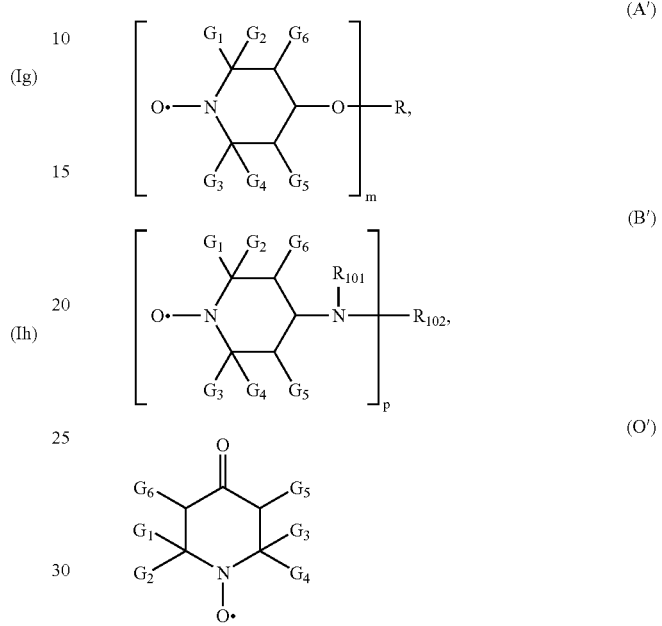

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkenoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$-$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl.

8. A process according to claim 1, wherein the nitroxyl radical of step a2) is of formula (Ic'), (Id'), (Ie'), (If'), (Ig') or (Ih')

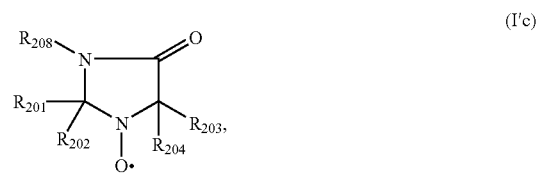
(I'c)

-continued

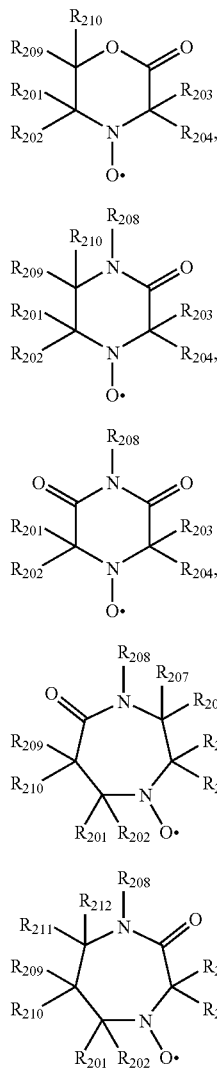

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl; and $R_{209}$, $R_{210}$, $R_{211}$ and $R_{212}$ are independently hydrogen, phenyl or $C_1$-$C_{18}$alkyl.

9. A process according to claim 1, wherein in step a3) [In] represents the polymerization initiator fragment of a polymerization initiator of formula (III) capable of initiating polymerization of monomers or oligomers which polymerization initiator is selected from the group consisting of $C_1$-$C_8$-alkyl halides, $C_6$-$C_{15}$-aralkylhalides, $C_2$-$C_8$-haloalkyl esters, arene sulfonyl chlorides, haloalkanenitriles, α-haloacrylates and halolactones, p and q represent one.

10. A process according to claim 1, wherein in step a3) the oxidizable transition metal in the transition metal complex salt is present as a transition metal complex ion in the lower oxidation state of a redox system.

11. A process according to claim 10, wherein the transition metal complex ion is a Cu(I) complex ion in the Cu(I)/Cu(II) system.

12. A process according to claim 1 wherein the nitroxyl ether of formula

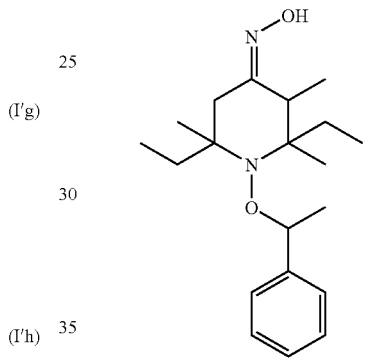

is used in the polymerization step a1).

13. A process according to claim 1 wherein the optionally used additional ethylenically unsaturated monomer is selected from the group consisting of an acrylic acid ester, acrylamide, acryinitrile, methacrylic acid ester, methacrylamide, methacrylnitrile and styrene.

14. A process according to claim 1 wherein the polymerization temperature in the steps a1), a2) or a3) is between 90° C. and 150° C.

15. A process according to claim 1 wherein the hydroxyvinyl aromatic oligomer, cooligomer, polymer or copolymer has a weight molecular weight average from 2000 to 30 000 Daltons.

16. A process according to claim 1 wherein the iodosilane reagent of step b) is $R_{13}R_{14}R_{15}SiI$, wherein $R_{13}$, $R_{14}$ and $R_{15}$ are independently $C_1$-$C_8$alkyl, chloromethyl, vinyl or phenyl.

17. A process according to claim 1 wherein the reaction with a halosilane reagent is carried out using a chlorosilane reagent from $R_{13}R_{14}R_{15}SiCl$ wherein $R_{13}$, $R_{14}$ and $R_{15}$ are independently $C_1$-$C_8$alkyl, chloromethyl, vinyl or phenyl in the presence of a halide salt and/or thiol, wherein the halide salt is selected from the group consisting of alkaline metal halide, alkaline-earth metal halide, ammonium halide or phosphonium halide.

* * * * *